United States Patent
Bernhart et al.

(10) Patent No.: US 7,363,060 B2
(45) Date of Patent: Apr. 22, 2008

(54) MOBILE TELEPHONE USER INTERFACE

(75) Inventors: George Bernhart, Trophy Club, TX (US); Dominik Jaworek, Vancouver (CA); Yannick Pellet, Helsinki (FI); Maini Williams, Tampere (FI); Tommi Salomaa, Tampere (FI)

(73) Assignee: Nokia Corporation (FI)

( * ) Notice: Subject to any disclaimer, the term of this patent is extended or adjusted under 35 U.S.C. 154(b) by 492 days.

(21) Appl. No.: 10/429,192

(22) Filed: May 2, 2003

(65) Prior Publication Data

US 2004/0219952 A1 Nov. 4, 2004

(51) Int. Cl.
*H04M 1/00* (2006.01)
(52) U.S. Cl. .................. 455/567; 455/414.1; 455/566; 455/575.1
(58) Field of Classification Search ........... 455/567, 455/414.1, 566, 575.1
See application file for complete search history.

(56) References Cited

U.S. PATENT DOCUMENTS

| | | | |
|---|---|---|---|
| 5,374,924 A | | 12/1994 | McKiel, Jr. |
| 5,664,061 A | * | 9/1997 | Andreshak et al. ......... 704/275 |
| 5,819,200 A | * | 10/1998 | Tamai et al. .............. 701/208 |
| 5,950,123 A | * | 9/1999 | Schwelb et al. .......... 455/414.4 |
| 6,067,081 A | * | 5/2000 | Hahlganss et al. .......... 345/173 |
| 6,304,879 B1 | * | 10/2001 | Sobeski et al. ......... 707/103 R |
| 6,850,150 B1 | * | 2/2005 | Ronkainen ................ 340/7.58 |
| 6,999,066 B2 | * | 2/2006 | Litwiller .................... 345/173 |
| 2003/0234824 A1 | * | 12/2003 | Litwiller .................... 345/865 |
| 2004/0204129 A1 | * | 10/2004 | Payne et al. ................ 455/566 |

OTHER PUBLICATIONS

Written Opinion of the International Searching Authority dated May 8, 2007.
International Search Report dated May 8, 2007.

* cited by examiner

*Primary Examiner*—Matthew Anderson
*Assistant Examiner*—Minh Dao
(74) *Attorney, Agent, or Firm*—Banner & Witcoff

(57) ABSTRACT

An improved user interface for use with a mobile telecommunication device such as a mobile phone to make its featured more accessible to a sight-impaired user. The user interface employs a collection of distinguishable non-visual (NV) cues that are selectively generated as the user chooses a feature for activation by navigating through a menu system. The NV cues may take any of several forms, but are most usually vibration pulses or audible sounds, or a combination of these two forms. As the user navigates through the menu system by sequentially selecting from available options, the NV cues are generated so that the user can sense a location within the menu system. The different NV cues may be associated with the availability of certain selected options, the selection of them, or organized in a manner analogous to the manner in which the options themselves are organized.

32 Claims, 5 Drawing Sheets

| LEVEL 1 | LEVEL 2 | LEVEL 3 |
|---|---|---|
| MESSAGE | | |
| | TEXT MESSAGES | |
| | | INBOX |
| | | SAVED |
| | | ERASE |
| | | [ INBOX ] |
| | VOICE MESSAGES | - |
| | WELCOME NOTES | - |
| | [ TEXT MESSAGES] | - |
| CALL LOG | | |
| | MISSED CALLS | - |
| | RECEIVED CALLS | - |
| | DIALED CALL | - |
| | CLEAR CALL LISTS | - |
| | CALL TIMES | - |
| | [ MISSED CALLS ] | - |
| PROFILES | | |
| | NORMAL | |
| | | SELECT |
| | | CUSTOMIZE |
| | | [ SELECT ] |
| | SILENT | - |
| | MEETING | - |
| | OUTDOOR | - |
| | PAGER | - |
| | HEADSET | - |
| | [ NORMAL ] | - |
| •  •  • | | |
| KEYGUARD | (NONE) | |
| [ MESSAGES ] | | |

FIG. 4

MOBILE TELEPHONE USER INTERFACE

FIELD OF THE INVENTION

The present invention relates generally to the field of telephone user interfaces, and more specifically to a method and apparatus for increasing telephone-feature accessibility using non-visual cues.

BACKGROUND OF THE INVENTION

Mobile telephones, once a rarity, are now used by a large segment of the population and continue to gain in popularity. At their introduction, of course, mobile telephones were generally too expensive to obtain for casual use or convenience, so they were only used by either those with a definite need for mobile communications or those having sufficient wealth to be able to afford such a luxury. Widespread use of mobile telephones was also limited in the past by the capacity of whatever telecommunications systems were needed to support them.

Mobile telephones are basically portable radios having both a transmitter and a receiver. Radio communication uses electromagnetic radio waves to send information from one station to another. For voice communications, a microphone on the telephone picks up the user's voice (and any other sounds present) so that it can be converted into radio waves and transmitted. These radio waves start in a standard format, but are than modulated, or changed in a way that a receiver can analyze them and convert the information thus carried into recognizable sounds. The transmitted radio signal is amplified to a power level sufficient to enable propagation to the intended receiver.

The recent increase in mobile-telephone use is attributable in part to the rapid and steady development of various technologies. The development of smaller and more efficient electrical components has made mobile telephones more portable and easier to carry around. While overall power consumption is reduced, the batteries needed for extended mobile use have decreased in size as well. All these advances have been made available to the public at a reduced cost due to both more efficient manufacturing techniques and to economies of scale that derive from the mobile telephone's increased popularity.

At this point, it should also be noted that as the terms for radio telephones, such as "cellular (or cell) phone" and "mobile phone" are often used interchangeably, they will be treated as equivalent herein. Both, however, are a sub-group of a larger family of devices that also includes, for example, certain computers and personal digital assistants (PDAs) that are also capable of wireless radio communication in a radio network. This family of devices will for convenience be referred to as "mobile stations" (regardless of whether a particular device is actually moved about in normal operation).

FIG. 1 is an illustration of a typical mobile station 100, in this case a mobile phone 100. Mobile phone 100 is a radio telecommunication device for use in a radio telecommunication network. It contains a radio transmitter and receiver (not shown) for sending transmissions to nearby base stations that are in turn connected with the main network. The network itself naturally provides for intra-network communication, and also includes gateways through which other networks, such as the public-switched telephone network (PSTN) and the Internet may be accessed.

The internal circuitry and components (not shown) of mobile phone 100 are contained in a casing, or enclosure, that typically includes two or more sections, which will sometimes herein be referred to as covers. Referring to FIG. 1, mobile phone 100 has an enclosure 101 that includes front cover 120 and back cover 122, which are removably fastened together at joint 105 when the phone is assembled. Attached battery 124 provides a portable power source, and antenna 126 aids in transmitting and receiving radio signals. A plurality of small openings 142 formed in front cover 120 serve as a port for the speaker (not shown), which is mounted beneath them. At the opposite end of mobile station 100, microphone port 144 likewise permits entry of sound directed at the actual microphone (not shown) mounted inside. Power port 146 is for plugging in an external power adaptor and headphone port 148 for connecting an external headset and perhaps a microphone for hands-free operation.

The keypad 110 is a user interface including a plurality of openings, through which protrude keys such as alphanumeric keys 111, call control keys 112 (CALL) and 113 (END), scroll key 114 and function keys 115 and 116. As their names imply, these keys perform various duties in the phone's operation, with the alphanumeric keys 111 having a standard telephone keypad role, and the function and scroll keys used in connection with display 134. That is, the function of the function and scroll keys are variable and determined by the application state that the mobile phone is in, which is often translated into a word or icon displayed next to the key on display 134. Keys having a function that may be changed in this way are often called 'softkeys'. Other keys shown in FIG. 1 are power switch 118 and volume control key 117.

Display 134 is typically a liquid-crystal display (LCD) device. The LCD itself is protected by a plastic window pane 132, which is mounted to cover the display and protrude into window 130, an opening formed in front cover 120. As illustrated in FIG. 1, display 134 presents to the user such information as current softkey functions, telephone numbers, signal strength, and other information useful to the operation being performed. The protective window pane 132 is typically a component separate from the LCD, its chassis, and other portions of the internal assembly.

Modern mobile stations have a great many features. A feature is, generally speaking, something that can be done to or with the phone. Originally mobile stations were capable of doing little more than sending and receiving calls. It soon became evident however, that their utility could be increased if they could perform additional functions. For example, mobile telephones were provided with the ability to remember a plurality of telephone numbers so they would not have to be re-entered each time a call was made. This feature may be facilitated through the use of a speed-dial function, where activating a few keys in a certain, memorized sequence causes a remembered telephone number to be dialed. As both displays and memories improved, this feature became a directory feature, where many telephone numbers and information associated with them could be stored, and later recalled, displayed, and used through manipulation of the softkeys.

Another exemplary feature is the ability to silence the mobile station's alert that sounds each time a call is received, or to substitute a silent vibrating alert. In this way the station could be left on without the danger of interrupting a meeting, concert, or other event where ringing of a mobile station would be unwelcome. The volume of the ring can also be adjusted. Still another feature involves logging calls that have been received, missed, or dialed, so that the user can refer back to these logs, for example, for quickly returning or redialing the logged calls.

Any of these exemplary features, when present, can usually be accessed in one of several ways. First, commonly used features may be associated with a dedicated key on the mobile station such that pressing the key activates the feature, initiating its execution. But as can been seen from FIG. 1, there are already a great many keys on mobile phone 100, and adding one for each feature or option would be inconvenient, cumbersome, and impractical. For other features, a pre-determined sequence of keystrokes might also be used. The feature is then activated when the keys involved are pressed in a certain order. As the number of features continues to increase, however, the use of these memorized keystroke sequences becomes less practical.

Softkeys work especially well where a relatively large display is available, such as the display 134 shown in FIG. 1. The reason for this, of course, is that the function performed by each softkey varies, and the display can recite the action it is currently prepared to execute when it is pressed. In addition, the various mobile-station features may be logically grouped, so that they are arranged for use in accordance with a system of menus. That is, the many features available on mobile stations are not completely unrelated. They are normally susceptible to being grouped into categories in such a way that the user can first choose a category, then perhaps a subcategory, and finally the desired feature. In this case one of the softkeys may be used to scroll though the category choices, which are displayed -in turn on the display, until the desired one appears. The displayed category can be selected by pressing another key, probably a softkey. Then the subcatagories can be scrolled though in like fashion until the select key is pressed again. In this way, many organized featured can be accessed using only a scroll key and a single softkey. Although this process is in reality simply another key sequence, the presence of a display to show menu choices makes it one that is far easier to enter. The cell-phone user looking the display and busily working through a series of menu choices has become a familiar sight.

For sight-impaired users, however, the copious menu selections can become more of a burden than an advantage. Perfectly capable of making a telephone call, those who cannot read the display may have a difficult time navigating through a user interface that presents its myriad selections visually. And although the menu and softkey system has made it possible to accommodate a large number of menu choices, the large number of choices available makes it difficult for the sightless to find the one feature that they need. Key sequences can be memorized, of course, so that reference to the visual display is not necessary, but the large number of available features tends to make these sequences quite long. Naturally, it would present little difficulty to reduce the large number choices to only a few that could be more conveniently accessed, but this also removes some of the advantages that come with a feature-rich telephone.

Needed, therefore, is a user interface that allows a sight-impaired user to more quickly navigate through a large number of available feature selections. The present invention provides just such a solution.

SUMMARY OF THE INVENTION

The present invention is an improved user interface for use in making the numerous features of a mobile-station more easily accessible to sight-impaired individuals. The invention includes the assembly of a library of non-visual (NV) cues that can be generated by the mobile station, including those produced by sound and vibration. The NV cues are associated with certain actions, events, or options that occur or become available to the user while operating the mobile station, or especially while navigating through an menu system that organizes the features and options in a logical or recognized manner. In one aspect, a multi-tiered menu system is associated with a variety of NV cues so that the user is able to sense when the menu at a certain level is being scrolled through, departed, or returned to. The invention may further include varying the NV cues associated with a single menu such that the user may recognize which menu it is without referring to the visual display, or in which direction it is being scrolled. Other NV cues may be assigned to penultimate options so that the user will know a particular action is imminent, or with an ultimate action, so that the user may sense immediately that an action has been taken.

BRIEF DESCRIPTION OF THE DRAWINGS

For a more complete understanding of the present invention, and the advantages thereof, reference is made to the following drawings in the detailed description below:

FIG. 4 is a table showing the organization of an exemplary set of menu functions for use with a mobile station.

DETAILED DESCRIPTION

FIGS. 1-5, discussed herein, and the various embodiments used to describe the present invention are by way of illustration only, and should not be construed to limit the scope of the invention. Those skilled in the art will understand the principles of the present invention may be implemented in any similar communication device, in addition to those specifically discussed herein.

The present invention is a user interface improvement that increases the accessibility of the features of a mobile station, particularly with regard to a sightless or sight-impaired user. The impairment could be physical or environmental, the latter taking into account using the instrument in limited light or with a limited field of view. The impairment might be voluntary, of course, such as with a person watching a sporting event who wants to use the mobile station without averting their eyes.

As mentioned above, the very numerous features offered on a modern mobile phone are typically made available for user selection through an organized menu system. The menu system, for example, displays a series of options from which the user can select, most often by using the mobile station's softkeys. An 'option', as the term is used here, is typically associated with a certain visual display that allows the user to initiate an action or to proceed to another option. The visual display, of course, is simply an external indication of the state that the mobile station is currently in, and from which it can proceed depending on the next input provide by the user. Nevertheless, the display is important in announcing the current location within the menu system through which the user is navigating.

Figure 1:
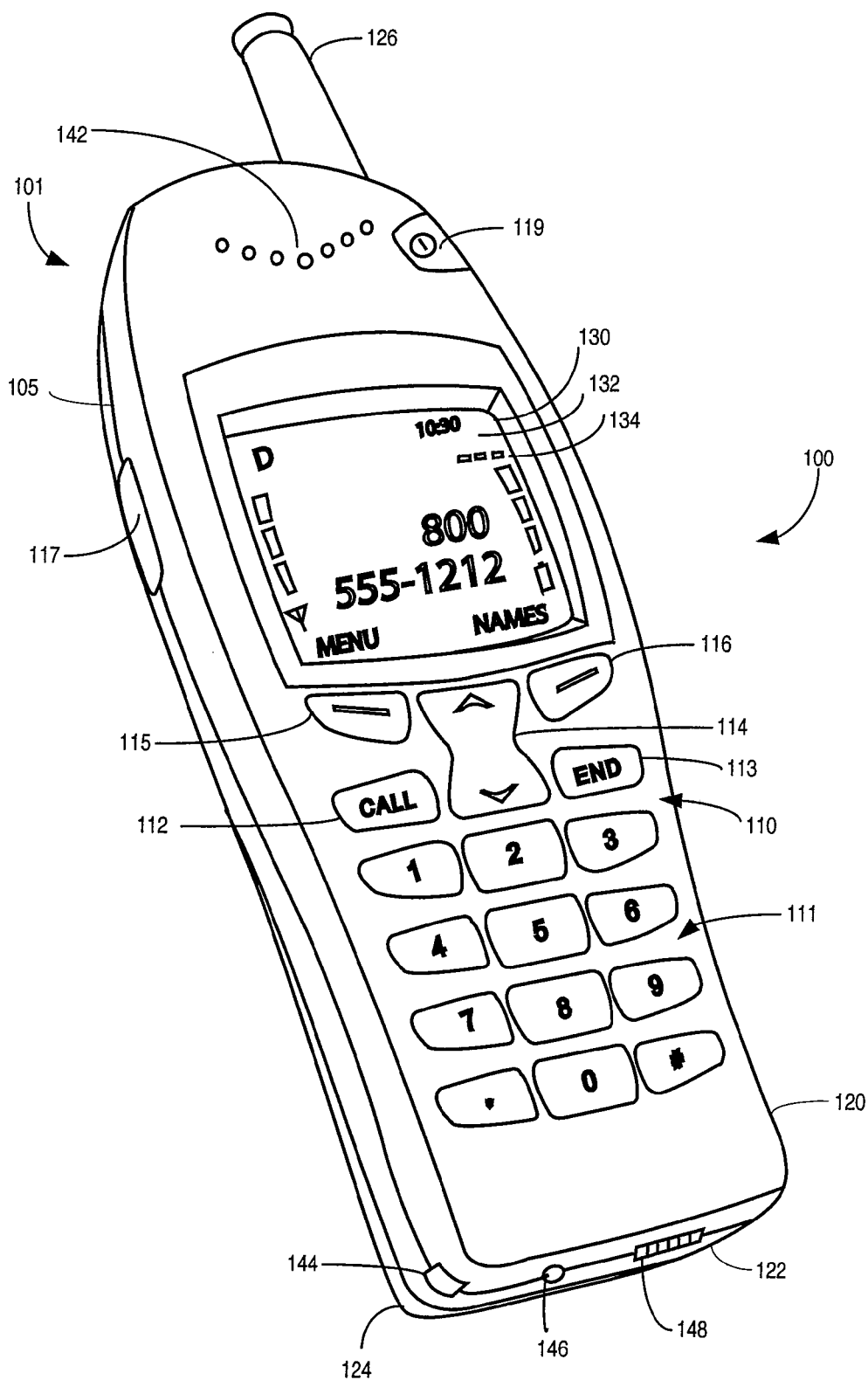
FIG. 1 is an illustration of a typical mobile station.
Figure 2:
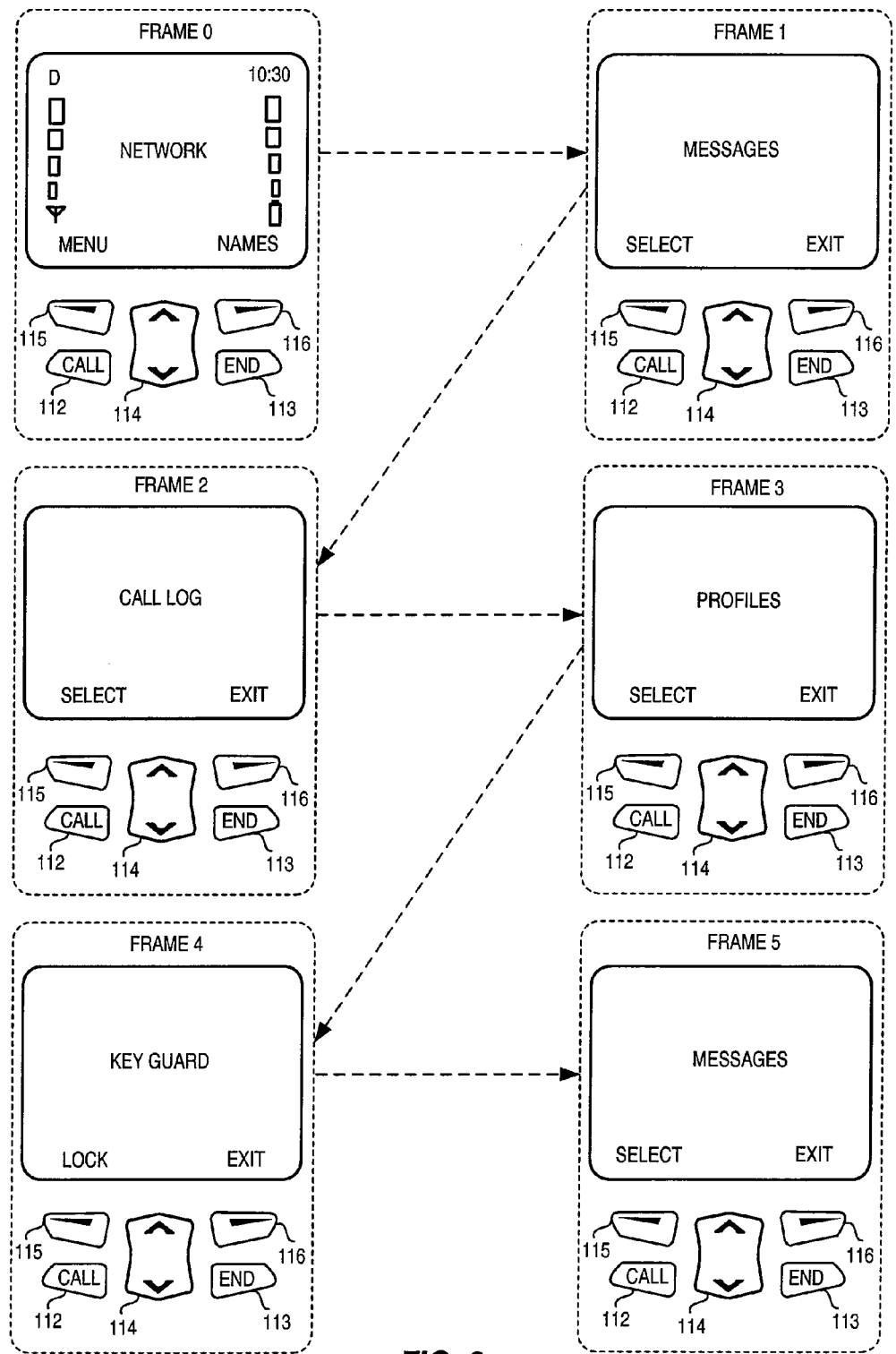
FIG. 2 is a series of illustrations showing an exemplary display sequence for selecting features using a menu system on a mobile station.
Figure 3:
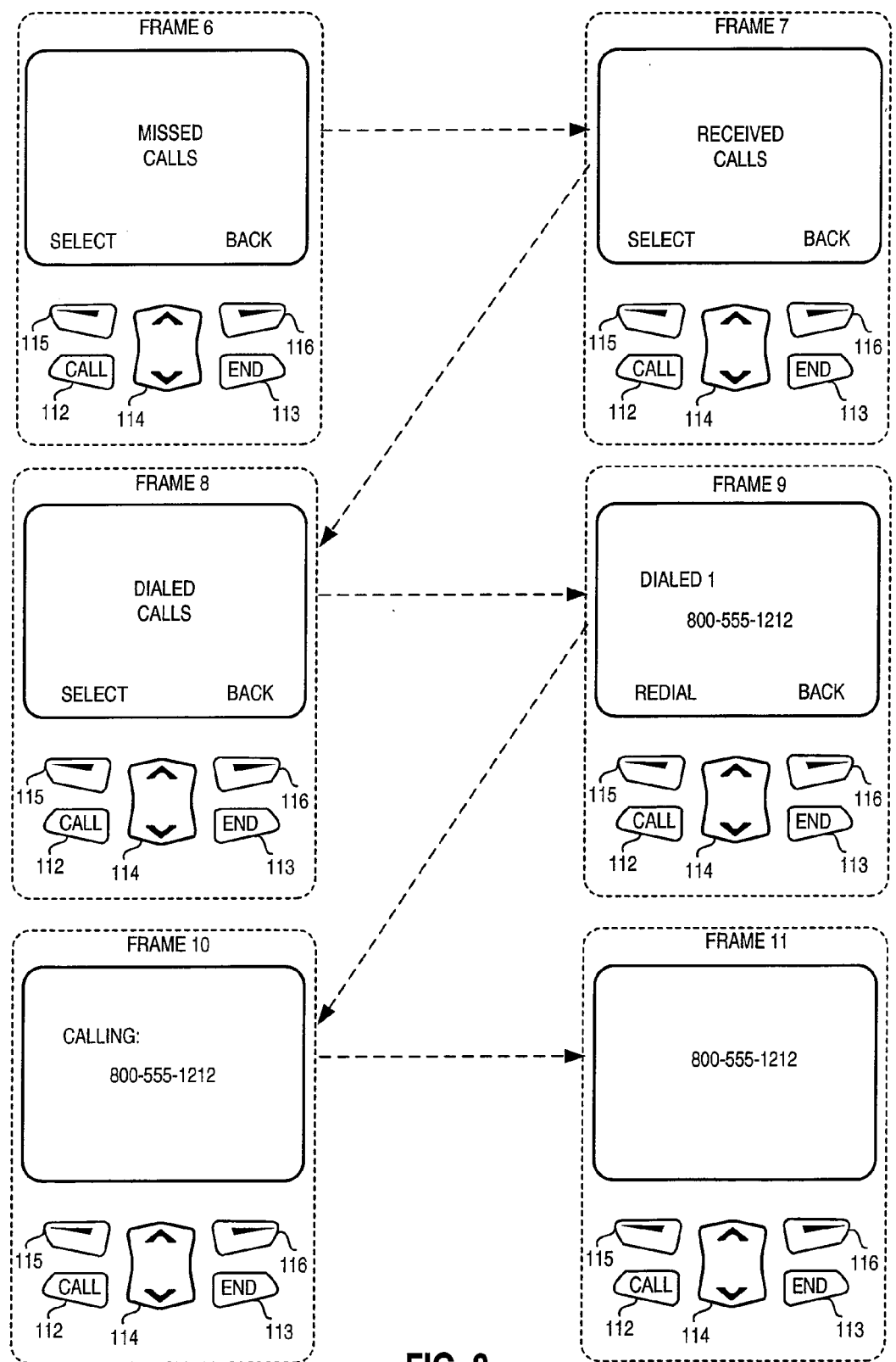
FIG. 3 is a series of illustrations showing an exemplary display sequence that might follow the section of a main menu item from the series presented in FIG. 2.

FIG. 2 is a series of frames illustrating an exemplary display sequence that might be seen by a user navigating through a menu system in a mobile station. In practice, of course, the various option and their associated displays will vary from one mobile station to another. Each display frame illustrated in FIG. 2 includes a graphic that would be shown on display 134 of mobile phone 100 (of FIG. 1) in juxtaposition to the call control keys 112 and 113, scroll key 114 and softkeys (function keys) 115 and 116.

In the embodiment of FIG. 2, Frame 0 is displayed by default when the phone is powered up and working properly. Frame 0 may also be the view (and corresponding internal state) to which the user is returned upon pressing the END key 113, and can be considered as the 'home' option screen. From the home screen of Frame 0, the softkey 115 can be used to select "MENU", which actually begins the menu navigation process. When this section is made, the first menu choice appears, in this case, "Messages" (frame 1). When this menu item is displayed, the soft key functions are changed to "SELECT" and "EXIT". Choosing the later causes the phone to exit the menu system and return (from this Frame) to the display of Frame 1. Pressing the softkey 115 associated with the "SELECT" option, however, activates the Message menu. That is, the separate sub-selections associated with the Message function.

Where neither of these selections are desired, the scroll key is pressed either "up" or "down" to present the user with other choices. In FIG. 2, for example, the user has scrolled down through the options labeled "Call Log" (Frame 2), "Profiles" (Frame 3), and "Keyguard" (Frame 4). Note that in Frame 4 the softkey 115 is labeled "LOCK"; this function simply allows the user to "lock" the keypad, meaning that most or all of the keys will not perform any function until they are "unlocked". (There are no sub-selections associated with this option.) Although the other frames allow the user to "SELECT" a separate menu of sub-selections, there is not requirement that this selection is available. Frame 5 is the same as Frame 1, meaning that the user has scrolled through all of the options on this menu and has returned to the first option. Alternately, the user could be returned to the home Frame 0 when the menu choices have been presented. In either case, the user could also have scrolled up, returning in order to previously viewed options.

The options shown in FIG. 2 can be referred to as an upper level or "main" menu, which in the menu organizational structure usually (but not always) provide an entry into a separate, lower level menu of options. This lower, or sub-main menu may typically be scrolled through as could the main menu. For example, if in Frame 3, illustrating the "Call Log" main-menu option, the use activates the "SELECT" function, then the first Call Log sub-menu option is displayed. This option is "Missed Calls", as seen in Frame 6 (shown in FIG. 3).

Although the exact nature of the feature is not the main point of this explanation, it is noted that selecting this exemplary feature (Missed Calls) initiates a listing of calls that have been received at the mobile station but not answered. The softkey functions in this Frame 6 include "LIST" and "BACK", which in this example will respectively initiate a missed-call listing, or return the user to the "Call Log" option (Frame 2 in FIG. 2).

Returning to FIG. 3, as with the main menu, the user may utilize the scroll key in order to view in sequence the other options available in the "Call Log" sub-main menu. For example, scrolling "down" from the "Missed Calls" display of Frame 6 might change the display to that of Frame 7, "Received Calls" or Frame 8, "Dialed Calls". Selecting "LIST" (using soft key 115) when viewing the frame 8 "dialed calls" produces the display shown in Frame 9, which is the first stored "dialed call". (The first may be the most recent, or alternately the oldest call still stored on the log.) In this example, when viewing frame 9 the user can select softkey 115 to "REDIAL" the displayed number, or softkey 116 to go "BACK" to the "Call Log" submenu. If the REDIAL selection is chosen, a call to the displayed number is placed and the display of frame 10 appears. Actually terminating the call with the called party may take several seconds, but Note that in Frame 11 of FIG. 3, the call has been connected and the display changes slightly. Note also that instead of placing the call, the user could have, at the option of Frame 9, used the scroll key 114 to view other numbers stored in the call log.

Naturally, these functions may, in other instruments, be activated by different keys than those described above; the scroll function may for example be invoked by a softkey. Or the different features may be selected from a menu of choices, where a given choice is activated by pressing a specified number key. The greatest advantage of the present invention will obtain, however, where the main menu (and submenus) can be accessed by scrolling from choice to choice, whichever key is used to do so. Note that the term 'scrolling' refers simply from the ability to move from option to option by repeatedly pressing the same button or sequence of buttons. (Actually executing a feature, such as placing a call, often though not necessarily requires that a softkey or other key besides the scroll key be used, just to avoid accidental execution.)

Note that for convenience herein the main menu selections presented in Frames 1 through 5 will be referred to as such, or as the level-one menu. The submenus initiated by selection from the main menu, for example Frames 6 through 8, the "Call Log" sub-menu, are each referred to as a level-two menu. Certain (or all) of the level-two menu options may enable the user to access a level-three menu, for example the "Dialed Calls" submenu, one option of which appears in Frame 9 (that option being the first "dialed number"). There may be further submenus, level-four and so on, but the utility of the menu-system organization lessens if too many levels are used. Of course, there is no requirement for symmetry, that is, not all of the menu options need to have the same number of access options or submenus as the others. Even a main-menu selection may simply allow access to a certain feature rather than allow the user to proceed to a level-two menu.

The menu system described by example above provides the user with convenient access to a great many features in a relatively logical way. Each selection from one displayed option either initiates a feature or a submenu providing further options, each accompanied by an appropriate display. While memorized sequences of keys (for example, "*39") may still be used to activate certain features, or as an alternative to the menu system, using the menu avoids the need to remember dozens of such codes. And the available selections are themselves displayed for reference in using the menu system, so there is no need to remember that a particular softkey "selects" from one menu location, but produces a submenu from another.

Not all of these advantages are available to the sight-impaired, of course, for whom it may be difficult or impossible to read the display. But the menu system still offers some benefits, one being simply the presence of these numerous features in the first instance. Were the menu system unavailable even for sighted persons, in other words, many of the features might be omitted as too difficult to access (using some other means). In addition, even if the displays cannot be viewed for one reason or another, the logical presentation of the features in a definite order may be exploited to make memorization easier. For example, referring to Frames 0 through 11, to redial a dialed call the sequence is softkey 115, scroll down, softkey 115, scroll down (twice), and finally softkey 115 (twice).

Note that redialing a number on any telephone often requires less keystrokes. There may be a dedicated redial key, or pushing the "CALL" key 112 may result in the redialing of the last number called. Using the menu system in combination with the call log, however, a number dialed two, three, or however many calls ago can also be accessed by scrolling before activating the "call" function (the final softkey 115 keystroke). Or a received-call number may be accessed and called by scrolling only once before the final select, then either calling or scrolling to a previously received call. In other words, by remembering the basic menu structure a user can access a variety of dialing features. The memorization will often be easier because the paths to related functions will be similar. A user that knows the "Call Log" menu selection has been reached will likely be able to remember the order of the level-two menu, if selected.

Nevertheless, it should be apparent that the number of keystrokes required for activating the numerous features is still not small, and that a significant investment of time may be incurred before the access of all useful features without using the display can be mastered. In addition, a user who is not referring to the display, and who becomes distracted may lose track of where in the menu system they are, and have to start over. (Most if not all menu-enabled mobile stations provide the ability to promptly return to a home state.)

The solution of the present invention is a feature-navigation aid that uses non-visual (NV) sensory cues, especially sound and vibration. This involves both creating a library of such NV cues, and then organizing them in a logical manner that hopefully can relatively easily be committed to memory. These two facets of the present invention are related in that the similarity or difference between one NV cue and another may itself contribute to the logical organization that makes them memorable.

To implement the present invention, each of a plurality of distinctive alerts is associated with certain menu states or choices. The plurality of distinctive alerts may include two or many, which are produced by varying the frequency, intensity, or duration of the non-visual sensory stimulus. Note that while it is chiefly sound and vibration that are discussed as NV cues herein, there could be others. For example, a sensory area on the mobile station (not shown) might protrude, retract, expand or shrink in size, or even heat up or deliver an electric shock to effect an NV cue. Or a key may become harder to push, resist pushing entirely, or rebound against the user to form another type of NV cue. Again, these may be used in combination with any other cues, including of course visual cues that may still be used (or, alternately, the user may elect to turn them off).

In building a library of these NV cues, the mobile station stores the necessary program instructions needed to generate each of them in an on-board memory location. Preferably, a user or service technician will be able to access the library to associate each of the cues with one or more options, the association also being stored in the memory of the mobile station, and to review, add, delete, or modify the cues themselves.

The present invention encompasses two basic ways to create an NV-cue organizational scheme. First, certain functions could be singled out for association with specific, presumably highly recognizable cues. The functions could be selected because they are often used, for example, or because they might be useful in cases of exigency. In a scrolling-menu system, these certain function could also be selected simply because they are useful markers, and the distinctive NV cue then serves as a reminder that a certain decision must now be made or, at least, that the need for a decision is approaching. An NV cue could also be assigned to signal an action taken, such as a call having been made, to give the user an (immediate) opportunity to cancel or rescind the action (such as ending the call before it is terminated at an unintentionally called party's telephone). The NV cues could also be used in conjunction with chosen features, such as vibrating in a certain pattern to notify the user that the keys are not functioning because they have been locked. Finally, varying NV cues could also be assigned to notify the user that an externally-initiated event has occurred, such as that a voice or text message has been received, or that a call has been missed.

There is no requirement, of course, that the same NV cue must be associated with only a single option, action, or event. A highly recognizable NV cue might be used with several, in which case the user would presumably know which option was being accessed by the context—what steps having been taken to reach the current state.

A variation of this embodiment is to assign certain distinctive NV cues to arriving at a penultimate state—such as when a certain next action will result in a call being made or a message being deleted. These are not the only such ultimate actions, of course, and the decision of which penultimate actions should be tagged may be left up to the user.

A second manner of organization follows somewhat from this variation, that is organizing the NV cues according to the mobile-station menu organization. FIG. 4 is a reference table (partially) showing the organization of an exemplary set of menu functions for use with a mobile station. Although only partial in nature, the reference table lists items located on menus of various levels, here Level 1, Level 2, and Level 3, and illustrates their relationship. Note, however, that there may be no relevance to the location of any specific option at a particular menu level, except that the assignment suits the organization scheme. In other words, the fact that there is one set of level-two menu selections associated with level-one item "Call-Log", and another set associated with the level-one item "Profiles" does not in itself mean that there is any relationship or equivalence between the two (level-two) sets.

In this embodiment, a first NV cue is associated with the main menu of the mobile station, and is generated with each move from one main-menu option to the next. In this way the user will always know that the main menu was being scrolled through. Note that much of the time this will be helpful in itself, as the user will eventually become fairly familiar with the menu order. In another embodiment, however, a certain distinctive NV cue could be associated with reaching the first main-menu option, meaning that the user has run completely through the menu choices and arrived back at the beginning. Of course, the distinctive NV cue (or another, different one) could be associated with a selected menu item that is only part-way through the menu, naturally to signal that the user has reached that point.

In like fashion, a second NV cue could be associated with the user's selection of a main-menu option, and the mobile station may then be scrolled through the submenu (in this case a level-two menu), with the second NV cue being generated at each scrolling step. A distinctive NV cue could be assigned here as well, to be generated when the user has scrolled though the entire submenu and arrived back at the beginning. In some cases, scrolling all the way through a submenu means that the main menu item from which the submenu was entered would reappear. In this case, it is preferable to simply generate the familiar first NV cue, the one normally associated with each main menu option. In other words, the first tone accompanies the display of a new main menu option, and the second tone accompanies the display of a level-two menu option.

Many level-two menu options, of course, serve as the entry point for level-three menus. Naturally, a third NV cue could in the same way be generated as each item on this menu is reached. The second NV cue would signal arrival at the level-two menu option from which entry into the third-level menu was achieved. At this point the user could elect to scroll though the level-two menu just returned to, or re-scroll through the level three-menu currently accessible.

As should be apparent, the first, second, and third NV cues discussed above at least in some measure allow a sight-impaired user to more easily navigate back and forth through the menu system in much the same way as do users able to view the display. Mistakes and 'wrong-turns' can be undone more easily than if the user simply has to return to the home or default state and start over. Even if no mistakes are made or changes of direction are undertaken, the NV-cue system will enable the user to more quickly and surely reach an intended item in the menu.

Of course, level-four menus also exist, and a fourth NV cue, or more, could be employed. Although there may by little disadvantage from carrying the organization system well beyond the third level of submenus, it should be remembered that creating too elaborate of a system may reach the point of diminishing returns, and may even confuse some users more than it helps.

It may be more advantageous to use the various embodiments of the present invention in combination, such as having a first and second NV cue for level-one (main) and level-two menus, respectively, and then incorporating a separate set of distinctive cues for certain selected states, as described above. In another embodiment, the level-two NV cues might be different for each (or for selected) level-two menus, so that the user could tell if the level-one menu was left at one point or the other simply by sensing the particular NV cues being generated as the current level-two menu is being scrolled.

In yet another embodiment, menus themselves could be assigned a series of NV cues, such as a musical scale that progresses as the menu is scrolled. The user would sense that the menu has started over when the progression returns to its initial NV cue. The advantage of this scheme is that the user may be able to sense a scrolling direction, and have at least some idea of how close the first level-one menu item is. If the initial NV cue is distinctive enough, the user may detect from it alone the return to a first menu option. Or the user may simply sense a change in the progression, for example a large change in pitch (that is, returning to the beginning of the scale) indicating that the first option has been scrolled through.

As should be apparent, this embodiment may be implemented with a vibration cue as well, with for example the intensity or duration of the vibration changing instead of the pitch of a tone. Or the use of sound and vibration may be combined, either with each other or for alternate functions. For example, a vibration pulse may signal return to the first menu option of a menu or submenu, cueing the user that they have been through all of the options in a given menu. By the same token, an NV cue may include a series of sounds or vibrations, or both used in combination. Even more simply, the beginning (first or entry option) of a menu could be signaled by an extra pulse of sound or vibration.

Naturally, the organizational system should be adaptable, and will preferably be able to adopt a silent operation whenever the ringer for the telephone is turned off as well. In many applications the user may be able to switch from a-system of audible cues to an analogous one using vibration pulses so that only a single basic set of sequences have to be remembered.

Figure 5:
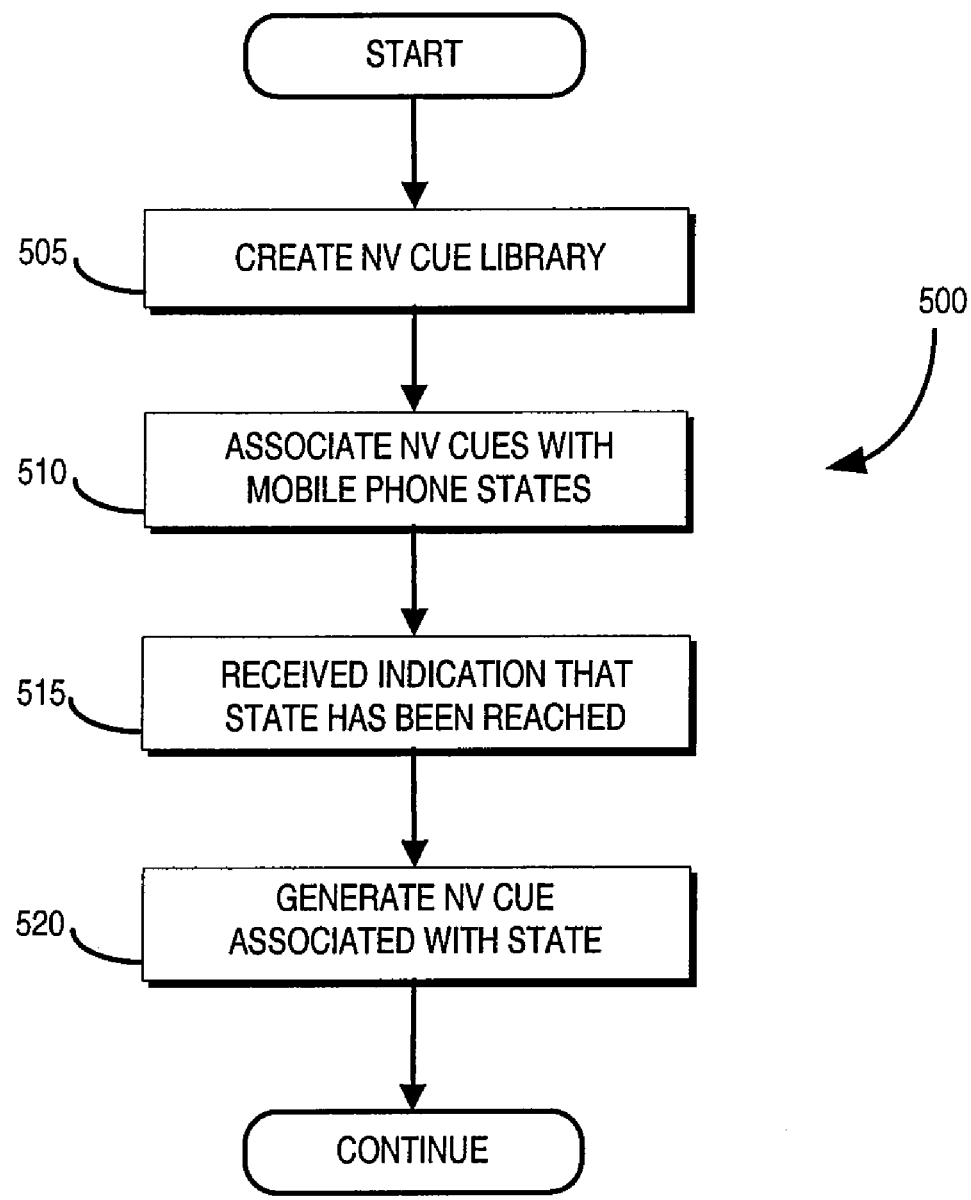
FIG. 5 is a simplified flow diagram illustrating a method of implementing a user interface according to an embodiment of the present invention.

FIG. 5 is a simplified flow diagram illustrating a method 500 of implementing a user interface according to an embodiment of the present invention. At START it is assumed that the mobile station has the capability of generating a variety of NV cues and sufficient memory for storing program instruction relating to how and when to do so. At step 505, a library of distinctive NV cues is stored in the memory of the mobile station. Note that an NV cue's distinctiveness is somewhat relative, and there may be a standard library using cues that most users would be able to distinguish one from the other. This library could be customized for users having above- or below-average perceptibility. At step 510, NV cues are associated with certain options (that is, states or display frames), actions, or events. Not all cues need to be used, however, nor does each state need to be associated with a cue. When an indication is received that a specified state has been reached (step 515), the associated cue is generated (step 520). The process then CONTINUES as the mobile phone awaits the nest state change.

The preferred descriptions are of preferred examples for implementing the invention, and the scope of the invention should not necessarily be limited by this description. Rather, the scope of the present invention is defined by the following claims.

What is claimed is:

1. An apparatus comprising:
   a processor configured to provide a plurality of user-actuatable features, at least some of the features being accessible through an organized menu system having a plurality of options for selectively accessing and activating the accessible features; and
   a user interface for navigating through the menu system to a particular option, said user interface comprising a non-visual (NV) cue generator operable to generate a plurality of distinguishable NV cues corresponding to a plurality of different menu options available for actuation via a scroll step within a first menu in the menu system;
   wherein the plurality of distinguishable NV cues are progressively ordered with respect to the position of their respective associated menu options within the first menu.

2. The apparatus of claim 1, wherein the NV cue generator is operable to generate audible sounds, and wherein at least one of the plurality of distinguishable NV cues is an audible sound.

3. The apparatus of claim 1, wherein the NV cue generator is operable to generate vibration pulses, and wherein at least one of the plurality of distinguishable NV cues is a vibration pulse.

4. The apparatus of claim 1, wherein the apparatus comprises a mobile terminal.

5. An apparatus comprising:
   a processor configured to provide a plurality of user-actuatable features, at least some of the features being accessible through an organized menu system having a plurality of options for selectively accessing and activating the accessible features; and
   a user interface for navigating through the menu system to a particular option, said user interface comprising a non-visual (NV) cue generator operable to generate a plurality of distinguishable NV cues corresponding to a plurality of different menu options available for actuation via a scroll step within a first menu in the menu system;
   wherein the plurality of distinguishable NV cues are progressively ordered with respect to the position of their respective associated menu options within the first menu and one of the plurality of NV cues is also generated when a menu option is selected for actuation in a second menu different from the first menu.

6. The apparatus of claim 5, wherein the apparatus comprises a mobile terminal.

7. An apparatus comprising;
   a processor configured to provide a plurality of user-actuatable features, at least some of the features being accessible through an organized menu system having a plurality of options for selectively accessing and activating the accessible features; and
   a user interface for navigating through the menu system to a particular option, said user interface comprising a non-visual (NV) cue generator operable to generate at least one of a plurality of distinguishable NV cues when a selected option is available for actuation, and also operable to generate at least another one of the plurality of NV cues when a different selected option is available for actuation;
   wherein the organized menu system is organized into at least a level-one menu and at least one level-two menu from which options may be selected, the at least one level-two menu is accessed by selecting an option from the level-one menu, and a first NV cue is generated when a level-one menu option is available for actuation and a second NV cue is generated when an option from the at least one level-two menu is available for actuation.

8. The apparatus of claim 7, wherein the organized menu system is further organized into at least one level-three menu from which options may be selected, the level-three menu is accessed by selecting an option from the level-two menu, and a third NV cue is generated when a level-three menu option is available for actuation.

9. The apparatus of claim 7, wherein the at least one level-two menu comprises a plurality of level-two menus, each level-two menu accessible by selecting an option from the level-one menu.

10. The apparatus of claim 9, wherein the second NV cue is generated when an option from any of the level-two menus is available for actuation.

11. The apparatus of claim 7, wherein the at least one level-two menu system comprises a plurality of options through which a user may scroll to view each option in sequence, returning at the end of the sequence to the first available level-two option, and the second NV cue is generated whenever a level-two option is available for actuation except that an NV cue other than the second NV cue is generated when the first available option of the level-two options is available such that the user is able to sense when the sequence is restarting.

12. The apparatus of claim 7, wherein the at least one level-two menu system comprises a plurality of options through which a user may scroll to view each option in sequence, returning at the end of the sequence to the level-one option from which the at least one level-two menu was entered, and the second NV cue is generated whenever a level-two option is available for actuation and the first NV cue is generated when the level-one option from which the at least one level-two menu was entered is available such that the user is able to sense when the level-two sequence may be restarted.

13. The apparatus of claim 7, wherein the at least one at least one level-two menu system comprises a plurality of options through which a user may scroll to view each option in sequence, returning at the end of the sequence to the first available level-two option, the second NV cue is generated when the first level-two option is available for actuation, and each of the availability of each of the succeeding level-two menu options is associated with a progressively different NV cues such that the user may sense that the sequence is being scrolled though in a specific direction.

14. The apparatus of claim 13, wherein the progressively different NV cues are audible sounds.

15. The apparatus of claim 14, wherein each of the progressively different NV cues vary in pitch from the preceding NV cue.

16. The apparatus of claim 7, wherein the apparatus comprises a mobile terminal.

17. An apparatus comprising:
   a processor configured to provide a plurality of user-actuatable features, at least some of the features being accessible through an organized menu system having a plurality of options for selectively accessing and activating the accessible features;
   a user interface for navigating through the menu system to a particular option, said user interface comprising a non-visual (NV) cue generator operable to generate at least one of a plurality of distinguishable NV cues when a selected option is available for actuation, and also operable to generate at least another one of the plurality of NV cues when a different selected option is available for actuation; and
   a NV cue generator operable to generate at least one of the plurality of distinguishable NV cues when a predetermined option is selected so that the user is provided with an immediate opportunity to cancel an operation initiated by the selection of the predetermined option.

18. The apparatus of claim 17, wherein selecting the predetermined option initiates the making of a call from the apparatus.

19. The apparatus of claim 18, wherein the at least one of a plurality of distinguishable NV cues is a vibration pulse.

20. The apparatus of claim 17, wherein the apparatus comprises a mobile terminal.

21. A computer-readable medium having stored thereon computer-executable instructions for instructing a computing device to perform steps comprising:
   providing on the computing device a user interface for navigating through a menu system to an option of a plurality of options, the plurality of options for selectively accessing and activating user-actuatable features of the computing device;
   generating a first non-visual (NV) cue when a first selected option is available for actuation; and
   generating a second NV cue when a second selected option is available for actuation, the second NV cue being distinguishable from the first NV cue, the second selected option being different than the first selected option;

wherein the menu system is organized into at least a level-one menu and a level-two menu from which options may be selected, the level-two menu is accessed by selecting an option from the level-one menu, the first NV cue is generated when the first selected option is a level-one menu option and the second NV cue is generated when the second selected option is a level-two menu option.

22. The computer-readable medium of claim 21, wherein the computing device comprises a mobile terminal.

23. The computer-readable medium of claim 21, wherein, for the steps of generating, the NV cues comprise audible sounds.

24. The computer-readable medium of claim 21, wherein, for the steps of generating, the NV cues comprise vibration pulses.

25. A method comprising:
providing on an apparatus a user interface for navigating through a menu system to an option of a plurality of options, the plurality of options for selectively accessing and activating user-actuatable features of the apparatus;
generating a first non-visual (NV) cue when a first selected option is available for actuation; and
generating a second NV cue when a second selected option is available for actuation, the second NV cue being distinguishable from the first NV cue, the second selected option being different than the first selected option;
wherein the menu system is organized into at least a level-one menu and a level-two menu from which options may be selected, the level-two menu is accessed by selecting an option from the level-one menu, the first NV cue is generated when the first selected option is a level-one menu option and the second NV cue is generated when the second selected option is a level-two menu option.

26. The method of claim 25, wherein the apparatus comprises a mobile terminal.

27. The method of claim 25, wherein, for generating the NV cues, the NV cues comprise audible sounds.

28. The method of claim 25, wherein, for generating the NV cues, the NV cues comprise vibration pulses.

29. An apparatus comprising:
means for providing on the apparatus a user interface for navigating through a menu system to an option of a plurality of options, the plurality of options for selectively accessing and activating user-actuatable features of the apparatus;
means for generating a first non-visual (NV) cue when a first selected option is available for actuation; and
means for generating a second NV cue when a second selected option is available for actuation, the second NV cue being distinguishable from the first NV cue, the second selected option being different than the first selected option;
wherein the menu system is organized into at least a level-one menu and a level-two menu from which options may be selected, the level-two menu is accessed by selecting an option from the level-one menu, the first NV cue is generated when the first selected option is a level-one menu option and the second NV cue is generated when the second selected option is a level-two menu option.

30. The apparatus of claim 29, wherein the apparatus comprises a mobile terminal.

31. The apparatus of claim 29, wherein the NV cues comprise audible sounds.

32. The apparatus of claim 29, wherein the NV cues comprise vibration pulses.

* * * * *